United States Patent [19]
Cohen et al.

[11] 4,336,760
[45] Jun. 29, 1982

[54] EARTH WORKING APPARATUS INCLUDING AERATORS AND MATERIAL DISPENSERS

[75] Inventors: Sidney Cohen, Spring Valley; Robert Schlemmer, West Nyack, both of N.Y.

[73] Assignee: Improved Lawn Equipment Corporation, Spring Valley, N.Y.

[21] Appl. No.: 243,368

[22] Filed: Mar. 13, 1981

[51] Int. Cl.$^3$ ........................ A01B 49/06; A01B 45/02
[52] U.S. Cl. .................................. 111/11; 74/100 R;
172/21; 172/43; 172/115; 172/418; 222/303; 474/118
[58] Field of Search ....................... 172/21, 22, 42, 43, 172/418, 115; 222/303; 474/128, 118, 129, 133, 138; 74/97, 100 R; 111/13

[56] References Cited
U.S. PATENT DOCUMENTS

| | | | |
|---|---|---|---|
| 360,274 | 3/1887 | Brown | 172/418 |
| 1,023,894 | 4/1912 | Jass | 222/303 X |
| 1,376,591 | 5/1921 | Towle | 172/418 X |
| 1,704,986 | 3/1929 | Marcy | 172/21 |
| 1,742,563 | 1/1930 | Stidger | 172/21 |
| 2,151,117 | 3/1939 | Kepler | 172/418 |
| 2,229,497 | 1/1941 | Dontje | 172/115 X |
| 2,314,035 | 3/1943 | Dontje | 172/21 |
| 2,450,749 | 10/1948 | Clark | 474/133 X |
| 2,474,085 | 6/1949 | Albright | 474/133 X |
| 2,768,570 | 10/1956 | Strid | 172/22 X |
| 3,140,677 | 7/1964 | Fraser | 111/8 |
| 3,163,333 | 12/1964 | Lindaberry | 222/303 X |
| 3,352,261 | 11/1967 | Bonnell | 172/43 X |
| 3,685,468 | 8/1972 | Paige et al. | 111/11 |
| 3,685,469 | 8/1972 | Rogers | 172/21 X |
| 3,995,569 | 12/1976 | Picardat | 172/21 X |
| 4,015,668 | 4/1977 | Wilson | 172/43 X |

FOREIGN PATENT DOCUMENTS

| | | | |
|---|---|---|---|
| 441434 | 1/1936 | United Kingdom | 172/22 |
| 617726 | 2/1949 | United Kingdom | 172/43 |
| 809544 | 2/1959 | United Kingdom | 172/21 |
| 1089843 | 11/1967 | United Kingdom | 172/21 |
| 1455240 | 11/1976 | United Kingdom | 172/43 |
| 1460272 | 12/1976 | United Kingdom | 172/43 |

*Primary Examiner*—Paul E. Shapiro
*Attorney, Agent, or Firm*—Hane, Roberts, Spiecens & Cohen

[57] ABSTRACT

An earthworking implement comprising a frame on which are supported front wheels, rear wheels and a rearmost dolly wheel. An aerator member with blades is rotatably secured to the frame between the front and rear wheels. The dolly wheel is mounted on the frame for rotation about a vertical axis at a location rearwards of the rear wheels. The front wheels and the dolly wheel represent endmost wheels on the frame. One of the endmost wheels is vertically movable with respect to the frame between raised and lowered positions, such that in the raised position the front wheels and dolly wheel define a common tangential plane which is at a level above the blades of the aerator member and below the rear wheels thereby establishing an operative aerating position whereas in the lowered position the front wheels and dolly wheel define a common tangential plane which is at a level below the aerator member and the rear wheels thereby establishing a transport position. A material dispenser can be positioned at the front of the frame for dispensing various materials onto the ground. The dispenser, front wheels and aerator can be power driven.

19 Claims, 14 Drawing Figures

EARTH WORKING APPARATUS INCLUDING AERATORS AND MATERIAL DISPENSERS

FIELD OF THE INVENTION

The invention relates to earthworking apparatus of the type comprising aerators and combination aerator and spreader units. The invention is particularly concerned with apparatus which is self-powered.

BACKGROUND

Various types of self-propelled aerators are known. Generally, these are relatively large, expensive machines which require substantial maintenance and expertise in their operation. Also, they are relatively expensive and generally are applicable to commercial agricultural uses. The use of machines having aerator and material dispensing functions is generally limited to large units in which the operator is seated on the unit.

Because of the large size of the conventional units they are not easily maneuvered and generally are used on large land sites in which straight line operations predominate.

SUMMARY OF THE INVENTION

An object of the invention is to provide an earthworking implement including an aerating member which is self-propelled and which is guided in its movement by an operator from behind the unit.

A further object of the invention is to provide an implement of the above type which is easily maneuverable and can operate in tight places and on sloped ground.

A further object of the invention is to provide an earthworking implement of the above type in which the operational state of the unit is easily adjusted from a transport state in which the aerator member is in an inoperative position and an operative state in which the aerator member is in an operative position adapted to penetrate into the ground.

Yet, another object of the invention is to provide an implement of the above type in which the control of the state of the implement is easily made by operation of a control lever adjacent engaging handles of the unit.

Another object of the invention is to provide an implement of the above type which further comprises means for dispensing various materials at the same time that the aerator member is operative to dig holes in the ground.

In accordance with the invention, there is provided an earthworking implement which comprises a frame carrying front wheels, rear wheels, an aerator member between the front and rear wheels and a dolly wheel at a location rearwards of the rear wheels. The rear wheels are rotatably secured to the frame and either the front wheels or the dolly wheel can be vertically moved with respect to the frame between raised and lowered positions. The front wheels and dolly wheel are located on the frame in relation to the rear wheels and aerator member such that when the adjustable wheel is in its raised position, the front wheels and dolly wheel define a common tangential plane which is at a level above the blades of the aerator member and below the rear wheels to establish an operative aerating position, whereas in the lowered position of the adjustable wheel, the dolly wheel and the front wheels define a common tangential plane which is at a level below the aerator member and the rear wheels to establish a transport position.

The implement can be driven by driving the aerator member in which case the blades of the aerator member dig into the ground to propel the implement forwardly. In the operative position, the rear wheels are disposed in immediate proximity to the ground to skim therealong and to serve as steering wheels when force is applied to one side of the implement to turn the implement. The penetration of the blades of the aerator member into the ground on the side which is forced downwardly provides differential action to turn the implement.

The invention also contemplates a direct drive of the front wheels in which case the vertically adjustable wheel is the dolly wheel.

DETAILED DESCRIPTION

Figures 1, 1A:
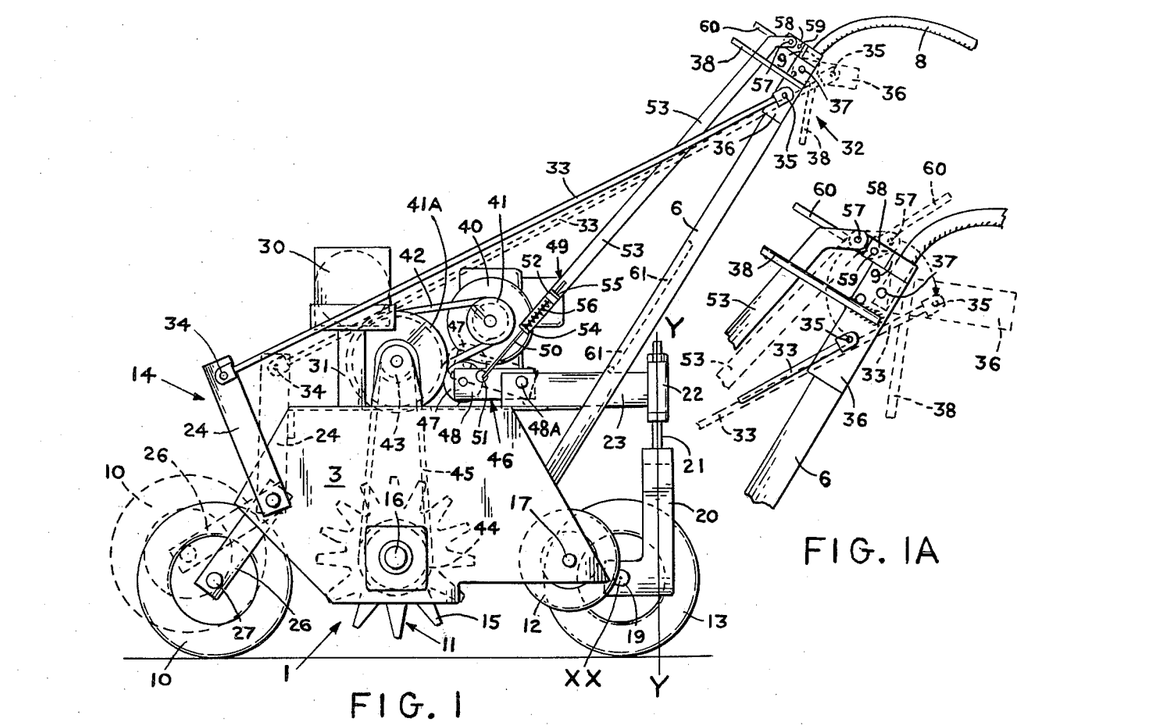
FIG. 1 is a side elevational view of an embodiment of an aerator according to the invention.
FIG. 1A shows a portion of the aerator in detail for different operating positions.
Figure 2:
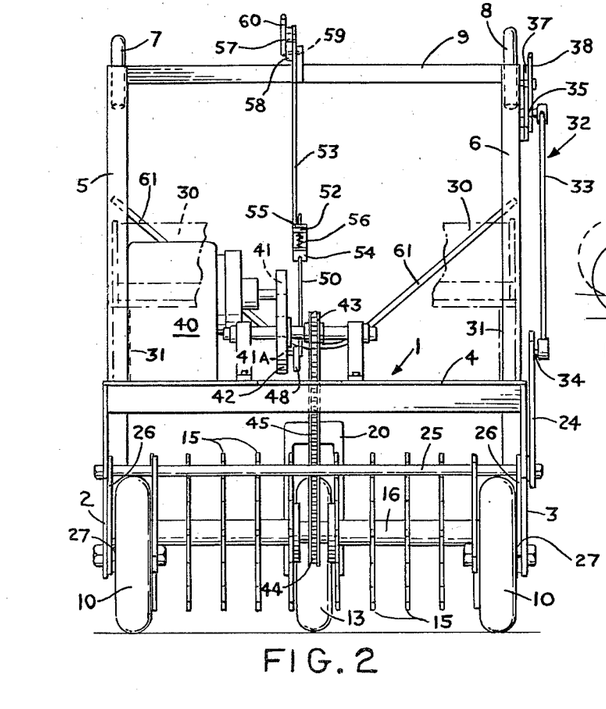
FIG. 2 is a front elevational view of the aerator.
Figure 3:
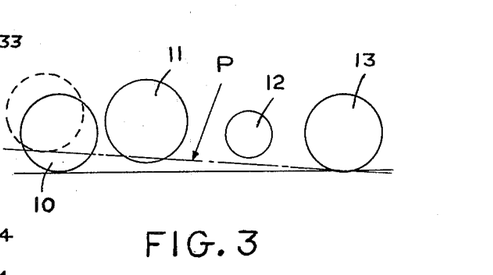
FIG. 3 is a diagrammatic illustration of the wheels and aerator member of the aerator in transport and operative positions.

Referring to FIGS. 1-3 showing an embodiment of an aerator according to the invention, herein it is seen that the aerator comprises a frame 1 comprising side plates 2 and 3 and a top shelf 4. The members of the frame are constructed of relatively rigid steel elements. A pair of arms 5 and 6 are secured to the frame 1, for example, by welding to the plates 2 and 3 respectively. The arms 5 and 6 extend upwardly and rearwardly and support handles 7 and 8 at their upper ends by which the aerator can be manually guided and propelled. A cross-arm 9 connects the arms 5 and 6 to form a rigid assembly therewith.

The frame 1 supports a pair of front wheels 10, an aerator member 11, a pair of rear wheels 12 and a dolly wheel 13. The front wheels 10 are secured to the frame by a mechanism 14 to be described in greater detail later which permits the front wheels 10 to be raised and lowered with respect to the frame 1. The aerator member 11 comprises a plurality of blades 15 secured on a shaft 16 which is rotatably supported at its ends in bearings secured in the side plates 2 and 3 of the frame 1. The rear wheels 12 are rotatably secured to the side plates 2 and 3 by shafts 17. The dolly wheel 13 is supported for free rotation on a shaft 19 which is secured in an L-shaped bracket 20 on which is secured a shaft 21 which is rotatable at a fixed vertical level in a bearing 22 fixed to an arm 23 fixed to the shelf 4 of frame 1. By reason of this construction, the L-shaped bracket 20 is rotatable about a vertical axis Y—Y passing through the center of shaft 21 and bearing 22. The Y—Y axis is vertically offset from an axis X—X which passes through the center of shaft 19 about which the dolly wheel 13 is freely rotatable. The offset position of the horizontal axis of rotation of the dolly wheel 13 with respect to the vertical axis of rotation Y—Y of the bracket 20 allows for offset contact of the wheel with the ground when the aerator is turned left or right in a manner to be explained later. The dolly wheel 13 has a diameter which is approximately equal to the diameter of the front wheels 10 and is considerably greater than the diameter of the rear wheels 12.

The mechanism 14 for raising and lowering the front wheels 10 comprises a support arm 24 mounted adjacent side plate 3 and secured to a shaft 25 which is rotatably supported in the side plates 2 and 3. Secured to the shaft 25 are plates 26 supporting respective front wheels 10 for free rotation about stub shafts 27. The arrangement is such that when the arm 24 is pivotably moved from the position in solid lines in FIG. 1 to the dotted position in FIG. 1, rotation of shaft 25 is produced which causes the plates 26 to raise the front wheels 10. In FIG. 3 the front wheel in its lowered and raised positions is diagrammatically illustrated. The relation of the front wheels with respect to the aerator member 11, the rear wheels 12 and the dolly wheel 13 is such that in the lowered position, the front wheels 10 and the dolly wheel 13 define a common tangential plane which is below the aerator member 11 and the rear wheels 12 to establish a transport position in which the aerator can be rolled along the ground without contact of the aerator member and rear wheels with the ground. In the raised position of the front wheels 10, the front wheels and dolly wheel 13 define a common tangential plane P and the tips of the blades of the aerator member extend below the plane P while the rear wheels 12 extend above the plane P. In this way, when the front wheels and dolly wheel rest on the ground, the tips of the aerator blades will penetrate into the ground and an operative aerating position is established. Viewed in another light, the tips of the aerator member 11 and the dolly wheel 13 define a common tangential plane which is at a level below the front and rear wheels. Hence, when the front wheel makes contact with the ground, the tips of the blades will penetrate into the ground in the aerating position. The rear wheels 12 are located at a minimal distance above the plane P so that when the aerator is advanced in a straight line along the ground in the aerating position, the rear wheels will effectively skim along the ground. Generally, the rear wheels will be positioned approximately one to two inches off the ground during the aeration operation. The rear wheels serve as steering wheels to facilitate turning of the aerator in the course of the aerating operation. Ordinarily, when the tips of the blades of the aerator member are in the ground, turning of a conventional aerator without rear steering wheels is virtually impossible. However, in the construction according to the invention, the frame 1 is positioned above the ground and when the operator presses down on one side or the other of the frame via the handles 7 and 8, the operator will bring the rear wheel on that side which is pressed down into rolling contact with the ground while raising the other side of the aerator along with the rear wheel thereat. The blades of the aerator member on the raised side will also lose contact with the ground. As a consequence, a differential action will be produced at the left and right sides of the aerator due to the engagement of the blades on one side with the ground and the raising of the blades at the other side. This differential action serves to turn the aerator in a direction opposite to the direction of tilting of the aerator. Thus, by leaning on the right side of the aerator, the operator will tend to turn the aerator to the left. The operation is virtually automatic and the turning radius of the aerator will be a function of the degree of pressure applied to one side or the other of the aerator. The dolly wheel 13 will follow the turning of the unit and shaft 21 will rotate in bearing 22. Thereupon the horizontal axis X—X of the dolly wheel will become laterally offset from the longitudinal axis of symmetry of the aerator by virtue of the L-shaped construction of the bracket 20 to facilitate the turning.

In order to increase the intensity of the pressure of the aerator member in the ground, such as when the ground is hard, a ballast or weight 30 is replaceably mountable in a support 31 on the shelf 4 of frame 1. When the ground is relatively soft, the weight 30 can be removed from the frame.

In order to raise and lower the front wheels, there is provided a first linkage mechanism 32. The linkage mechanism 32 comprises a rod 33 which is pivotably connected at 34 to the arm 24. At its upper end, the rod 33 is pivotably connected at 35 to a plate 36 which, in turn, is pivotably connected at pin 37 to the arm 6. An actuating lever 38 is affixed to plate 36 and in the lowered position of wheel 10, extends generally upwardly as seen in FIG. 1. In order to raise the wheels 10, the lever 38 is pulled rearwardly and upwardly to pivot plate 36 about pin 37 to occupy the dotted line position as seen in FIG. 1A. During this operation, the plate 36 is pivoted clockwise around pin 37 in FIG. 1A. In the course of the pivotal movement of the plate 36, the rod 33 acts to pivot the arm 24 causing rotation of shaft 25 and plates 26 therewith to raise wheels 10. The location of pivot 37 with respect to pivot 35 and pivot 34 is such that in the initial inoperative position, the line of action of rod 33 passes at a level below pin 37. As a result, a stable position is established for the wheels 10 in their lowered position. As the lever 38 is actuated to pivot plate 36 about pivot 37 to raise wheels 10, the pivot 35 will travel in a circular path with pivot 37 as its center. During this travel, the pivot 35 will first extend above the line joining pivots 37 and 34 and thereafter descend to a location below this line in its final position in which wheels 10 are raised. As a consequence, in the final position, the linkage 32 will be in a stable condition since the line of action through rod 33 will be at a level below pin 37. Hence, in the raised position, the wheels 10 will be stable. The linkage 32 constitutes an overcenter actuator linkage in which the end positions of the linkage as shown in FIG. 1A result in stable positions for the front wheels 10 while in the intermediate positions between these end positions, the linkage is unstable and tends to return to the lowered position of the front wheels 10.

A motor 40 is mounted on the shelf 4 of frame 1 and selectively drives the aerator member 11 to provide power aeration. The power delivered to the aerator member will also act to propel the aerator in a forward direction. In order to drive the aerator member, the motor 40 includes a pulley 41 mounted on the drive shaft of the motor so as to be rotatable therewith. A belt 42 is wound on pulley 41 and is also wound on a pulley 41A which is rotatably mounted on the frame 1. A sprocket 43 is driven with pulley 41A. A sprocket 44 is secured on shaft 16 of the aerator member and chain 45 is wound on sprockets 43 and 44 whereby drive can be transmitted from motor 40 to aerator member 11. In order to selectively couple and uncouple the motor and the aerator member, a clutch mechanicism 46 is provided which comprises a tensioning pulley 47 which is effective to selectively tension the belt 42 connecting pulleys 41 and 41A. In the tensioned condition of the belt 42, drive will be transmitted between pulleys 41 and 41A and thereby to the aerator member. In the non-tensioned position of the pulley 47, the belt 42 will travel idly on pulleys 41 and 41A. In order to move the tensioning pulley 47 between positions corresponding to the relaxed and tensioned states of belt 42, the clutch mechanism 46 comprises a bracket 48 which is pivotably mounted at 48A on the arm 23. A second linkage 49 serves to pivot the bracket 48 between a raised position in which belt 42 is tensioned and a lowered position in which belt 42 is relaxed. The raised and lowered positions of bracket 48 are shown in FIG. 1. The linkage 49 comprises a rod 50 which is pivotably connected to bracket 48 at pivot 51. Located on rod 50 at a remote location from pin 51 is an enlarged portion 52. The linkage 49 further comprises a bar 53 which has flanges 54 and 55 slidably supporting the rod 50. A buffer spring 56 is interposed between flange 54 and enlarged portion 52. The upper end of bar 53 is pivotably connected at 57 to a plate 58 which in turn is pivotably connected to crossbar 9 at pin 59. An actuator lever 60 is secured to plate 58 and extends generally forwardly in the lowered position of bracket 48 in which the tensioning pulley 47 allows the belt 42 to be relaxed whereby drive is not transmitted from the motor 40 to the aerator member 11. In order to couple the motor and the aerator member in driving relation, the actuator lever 60 is manually engaged and pulled rearwardly to pivot plate 58 around pin 59. The location of the pivot 51 of rod 50 with bracket 48 and of pivot 57 of bar 53 with plate 58 is such in relation to pivot pin 59 that when the lever 60 is moved to its rearward position, the line of action connecting pivots 51 and 57 will extend below pivot pin 59. As a consequence, the linkage 49 will undergo a movement beyond an overcenter position and occupy a stable condition when the bracket 48 has been raised and pulley 47 tensions belt 42. In the raised position of bracket 48, the spring 56 will be compressed between flange 54 and portion 52. In order to return the pulley 47 to the relaxed position for belt 42, it is necessary to apply a force to lever 60 to pivot plate 58 to a position in which the line of action through pivots 51 and 57 passes through pivot pin 59 after which the spring 56 will act to return bar 53 to its lowered position whereby the bracket 48 and the tensioning pulley will be lowered.

The aerator further comprises conventional operating cable mechanisms (not shown) for controlling the operation of the motor. The operation members for the cables will be located on the crossbar 9.

In order to strengthen the assembly, reinforcing members 61 connect the arm 23 to the arms 5 and 6.

Referring next to FIGS. 4-13, therein is shown a combined aerator and spreader which is self-propelled. The construction of this embodiment has many similarities with the aerator shown in FIGS. 1-3 and common elements therewith will be given the same number plus 100.

Figures 4, 7:
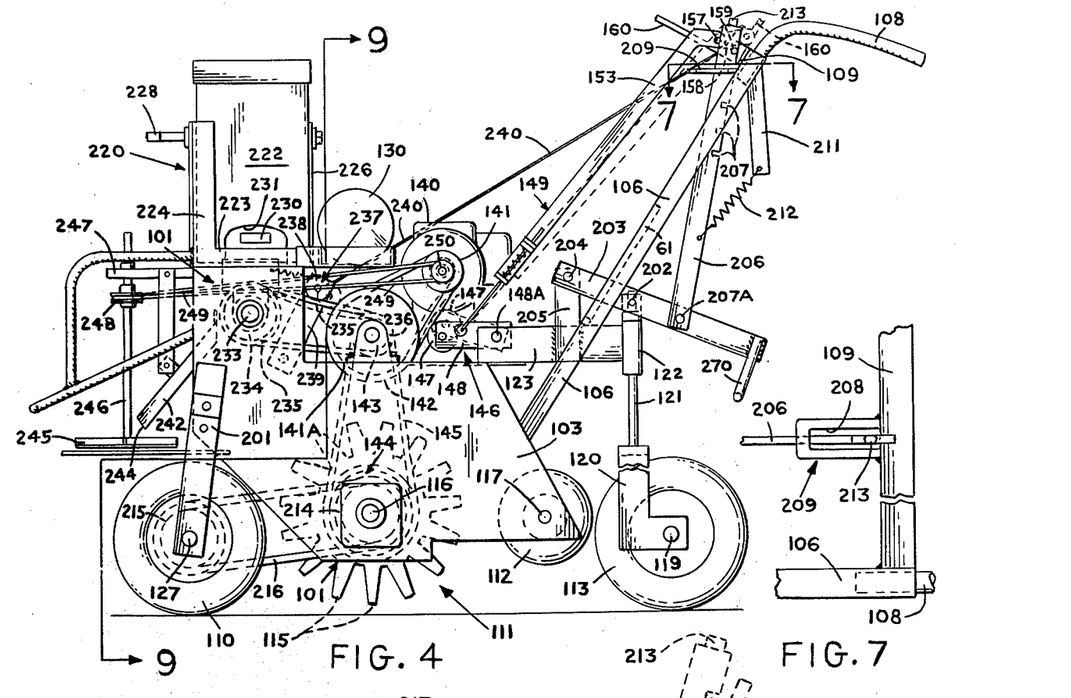
FIG. 4 is a side elevational view of an embodiment of an aerator and spreader combination, in transport position, according to the invention.
FIG. 7 is a sectional view taken along line 7—7 in FIG. 4.

The aerator and spreader comprises frame 101 having side plates 102 and 103 and upper shelf 104. Arms 105 and 106 extend upwardly from the side plates 102 and 103 and handles 107 and 108 extend respectively from the arms 105 and 106. Crossbar 109 extends between the arms 105 and 106. Front wheels 110 are fixed to frame 101 by means of plates 201 and 202 which are fixed to the side plates 102 and 103 of the frame. This is to be contrasted with the embodiment in FIGS. 1-3 in which the front wheels were capable of being raised and lowered. Aerator member 111 is mounted for rotation on the frame 101 and rear wheels 112 are mounted for rotation at the back of side plates 102 and 103 at stub shafts 117. Dolly wheel 113 is supported rearwardly of the rear wheels 112. The aerator member 111 comprises a plurality of blades 115 secured to rotatable shaft 116. Rear wheels 112 are freely supported for rotation about pins 117. The dolly wheel 113 has a shaft 119 which is freely rotatable in L-shaped bracket 120. A shaft 121 is mounted on and extends upwardly from the bracket 120 and is supported in a bearing 122 at the end of a beam 123 fixed to the shelf 104. In contrast with the embodiment of FIGS. 1-3 where the dolly wheel 13 is held at a fixed vertical level, the dolly wheel 113 is capable of being vertically moved between raised and lowered positions with respect to beam 123. For this purpose, the shaft 121 is freely slidable in the bearing 122. The upper end of the shaft 121 is connected by a pin 202 to a lever 203 which, in turn, is pivotably connected by a pin 204 to an upstanding support 205 fixed to the beam 123. At the right end of lever 203 is an actuating arm 270 of L-shape with a horizontal pedal 205 (FIG. 9) which can be engaged by a foot of the user to pivot lever 203 about pin 204. The lever 203 is shown in its lowered position in FIG. 4 so that the shaft 121 will be fully lowered in the bearing 122 and the dolly wheel 113 will occupy its lowermost position with respect to frame 101. A link arm 206 is pivotably connected at pin 207A to lever 203 and the link arm 206 has a plurality of notches 207 in the rear face thereof for holding the link arm 206 in a particular position. In this regard, the link arm 206 is slidably received in a slot 208 in a projection 209 fixed to the crossbar 109. The notches 207 are adapted to engage a shelf 210 of the projection 209. As illustrated in FIG. 4, the uppermost notch 207 engages the shelf 210 when the dolly wheel 113 is in its lowermost position with respect to beam 123. In order to oppose forward pivotal movement of link arm 206 about pin 207A, a counter link member 211 is fixed to crossbar 109 and a spring 212 is connected between the link arm 206 and link member 211. In the lowered position of dolly wheel 113 as shown in FIG. 4, spring 212 is stressed and pulls the link arm 206 to engage the uppermost notch 207 with the projection 209. When the link arm 206 is pivoted forwardly to release the uppermost notch 207 from projection 209, the entire weight of the aerator and spreader unit will act to lower the frame on shaft 121 of the dolly wheel 113. The lower notches 207 in the link arm 206 serve for holding the frame in adjustable lowered position on the shaft 121 to regulate the degree of penetration of the aerator member 111 in the ground. In order to facilitate the engagement and release of the notches 207 with the projection 209, a T-bar 213 is mounted at the upper end of the link arm 206.

Figures 5, 6, 8:
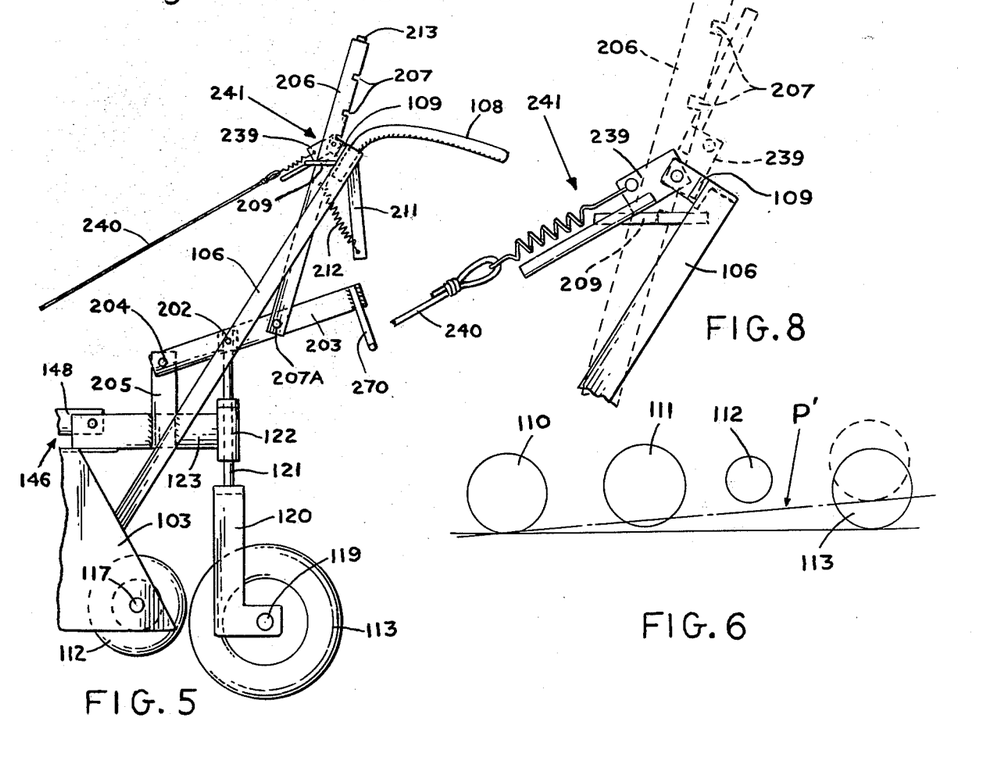
FIG. 5 shows a portion of the embodiment of FIG. 4 in operative position.
FIG. 6 is a diagrammatic illustration of the wheels and aerator member of the aerator and spreader combination in transport and operative positions.
FIG. 8 is an enlarged view of a portion of the combination in FIG. 4.
Figure 9:
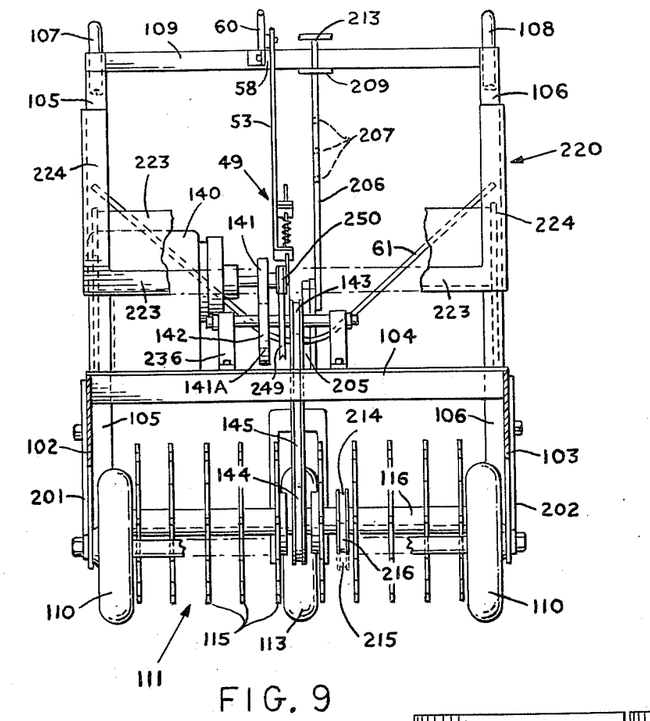
FIG. 9 is a front elevational view of the combination in FIG. 4.
Figure 10:
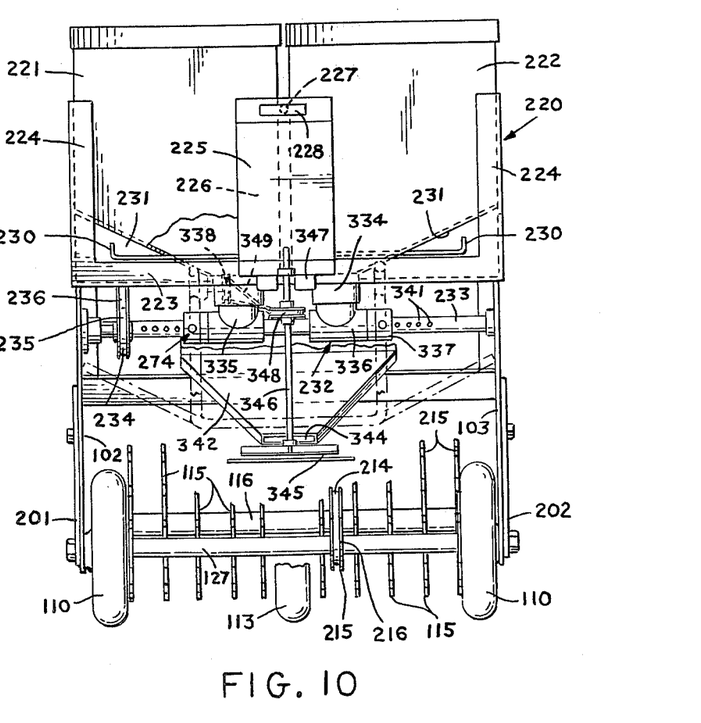
FIG. 10 is a sectional view taken along line 10—10 in FIG. 4.

FIG. 6 diagrammatically shows the arrangement of the front wheels, rear wheels and the aerator member for the raised and lowered positions of the dolly wheel. As seen in solid lines, the front wheel 110 and the dolly wheel 113 define a common tangential plane which is at a level below the aerator member 111 and the rear wheels 112. Thus, when the dolly wheel 113 is in its lowered position, the front wheels 110 and dolly wheel 113 be raised thereabove to constitute a transport position. When the dolly wheel 113 is lifted to the raised position as shown in dotted outline in FIG. 6, the front wheels 110 and the dolly wheel 113 will define a common tangential plane P' which extends above the periphery of the tips of the blades 115 of the aerator member 111 to establish the operating condition. In this regard, when the front wheels 110 and the dolly wheel 113 are in contact with the ground, the tips of the blades 115 will penetrate into the ground to effect an aerating operation when the unit is advanced. In the course of travel, the tips of the blades 115 will penetrate into the ground to form a succession of holes. As in the previous embodiment, the aerator member 111 is driven in rotation and the penetration of the blades 115 into the ground acts to advance the unit in a forwardly direction. Also, in accordance with the previous embodiment, the rear wheels 112 are positioned slightly above plane P' to skim along the ground and to serve as steering wheels for assisting in turning of the unit, when the operator presses down on one side or the other as previously described. Although reference has been made to raising and lowering of the dolly wheel 113, it is to be appreciated that this in relation to the beam 123 which is fixed to frame 101. In actuality, when the operator wishes to go from the operative aerating position to the inoperative transport position, the operator steps on actuator 270 to pivot lever 203 which has the effect of raising will be in contact with the ground and the aerator member 111 with the frame 101 so that the aerator member will be brought to a level above the common tangential plane of front wheels 110 and dolly wheel 113. The upper notch 207 in the back of link member 206 will be engaged with the projection 209 to lock the system in the inoperative position. To release the system so that the operative position will again be assumed, the link member 206 is pivotably moved about pivot 207A against the action of spring 212 so that notch 207 will become released from shelf 210 whereby the link member 206 can be freely moved upwardly through slot 208 as the weight of the unit will cause the beam 123 to ride downwardly on shaft 121 until the aerator member penetrates into the ground. The lower notches in the link member 206 can then be engaged with the shelf 210 to determine the height of the frame with respect to the shaft 121 of the dolly wheel and thereby the degree of penetration of the aerator member into the ground.

As in the embodiment in FIGS. 1–3, a replaceable ballast weight 130 can be mounted on the frame to increase the force of penetration of the aerator member 111 into the ground. Also, as in the embodiment of FIGS. 1–3, the aerator member is power driven and for this purpose motor 140 is mounted on the frame 101 and carries a pulley 141 on which is wound a belt 142 wound on pulley 141A. A pulley 143 is driven with pulley 141A. A pulley 144 is mounted on shaft 116 and a belt 145 drivingly connects pulleys 143 and 144.

Also, as in the embodiment of FIGS. 1–3, there is provided a clutch mechanism 146 for selectively coupling the drive pulley 141 with the pulley 141A by selectively tensioning or relaxing belt 142. The mechanism 146 comprises tensioning pulley 147 carried on plate 148 which is pivotably mounted by pin 148A on beam 123. Linkage mechanism 149 serves for selectively pivoting the plate 148 from a lowered position in solid lines in FIG. 4 in which belt 142 is relaxed to a raised position in dotted lines in FIG. 4 in which belt 142 is tensioned. The linkage mechanism 149 is identical to the linkage 49 in the embodiment of FIGS. 1–3 and therefore, no further discussion will be given hereat.

The embodiment of FIGS. 4–13 provides for drive of the front wheels 110. For this purpose, a sprocket wheel 214 (FIG. 7) is secured on shaft 116 of the aerator member and the sprocket wheel 214 drives a sprocket wheel 215 carried on shaft 127 which supports the wheels 110 and is rotatably mounted in the side plates 201. A chain 216 drivingly connects the sprocket wheels 214 and 215.

The embodiment of FIGS. 4–13 is also adapted for spreading various materials onto the ground. For this purpose, a mounting structure 220 is secured to the frame 101 for receiving two hoppers 221 and 222 which may contain respective substances to be spread. By way of example, the hoppers may contain fertilizer, seed, herbicides and the like. The mounting structure 220 includes a base 223 of angle shape cross-section from which extend upright front pillars 224 also of angle shape in cross-section. Front and rear securing plates 225 and 226 extend upwardly from base 223 at a center location along the transverse width of the mounting structure 220. A rod 227 joins the front and rear plates 225 and 226 to tightly engage the hoppers 221 and 222 after the latter have been mounted on the mounting structure 220. In this regard, the rod 227 is supported at its rear end in plate 226 for free rotational movement but with axial restraint. The front end of rod 227 is threadably engaged in front plate 225 whereby, when the rod 227 is rotated it will cause front plate 225 to flex rearwardly slightly to tightly hold the hoppers 221 and 222 in the mounting structure 220. A handle 228 is fitted at the front of the rod 227 to facilitate the rotation of the rod.

Each of the hoppers has a shutter 230 at its lower end by which the outlet of the hopper can be opened or closed. The side of each hopper is formed with a recess 231 to provide access to the shutter 230. The construction of the shutter has been found to be ineffective to control the amount of various materials and chemicals fed from the hopper and therefore a more precise distribution means has been provided. The shutters 230 merely serve to open and close the hopper outlets and a distribution system 232 controls the precise amount of materials to be discharged. The distribution system 232 is supported on a shaft 233 which is rotatably mounted in the side plates 102 and 103 of the frame 101. The shaft 233 carries a pulley 234 which is drivingly connected by a belt 235 to a pulley 236 which is driven with pulley 143. A separate clutching mechanism 237 is associated with belt 235 to selectively apply tension thereto in order to drivingly couple pulleys 236 and 234. The mechanism 237 is similar to mechanism 146 and comprises a tensioning pulley 238 attached to a pivotal plate 239 secured to the frame 101. A Bowden cable 240 is connected to plate 239 to pivotably move the plate and the cable 240 extends to the crossbar 109 where a conventional spring-loaded actuator 241 is secured to the crossbar. By actuating the spring-loaded actuator 241, the plate 239 can be pivotably moved to raise the tensioning pulley 238 and thereby apply tension to belt 235 and provide driving connection between pulleys 234 and 236. When the actuator 241 is released, the belt 235 is relaxed and pulley 234 will remain at rest.

Figures 11, 12, 13:
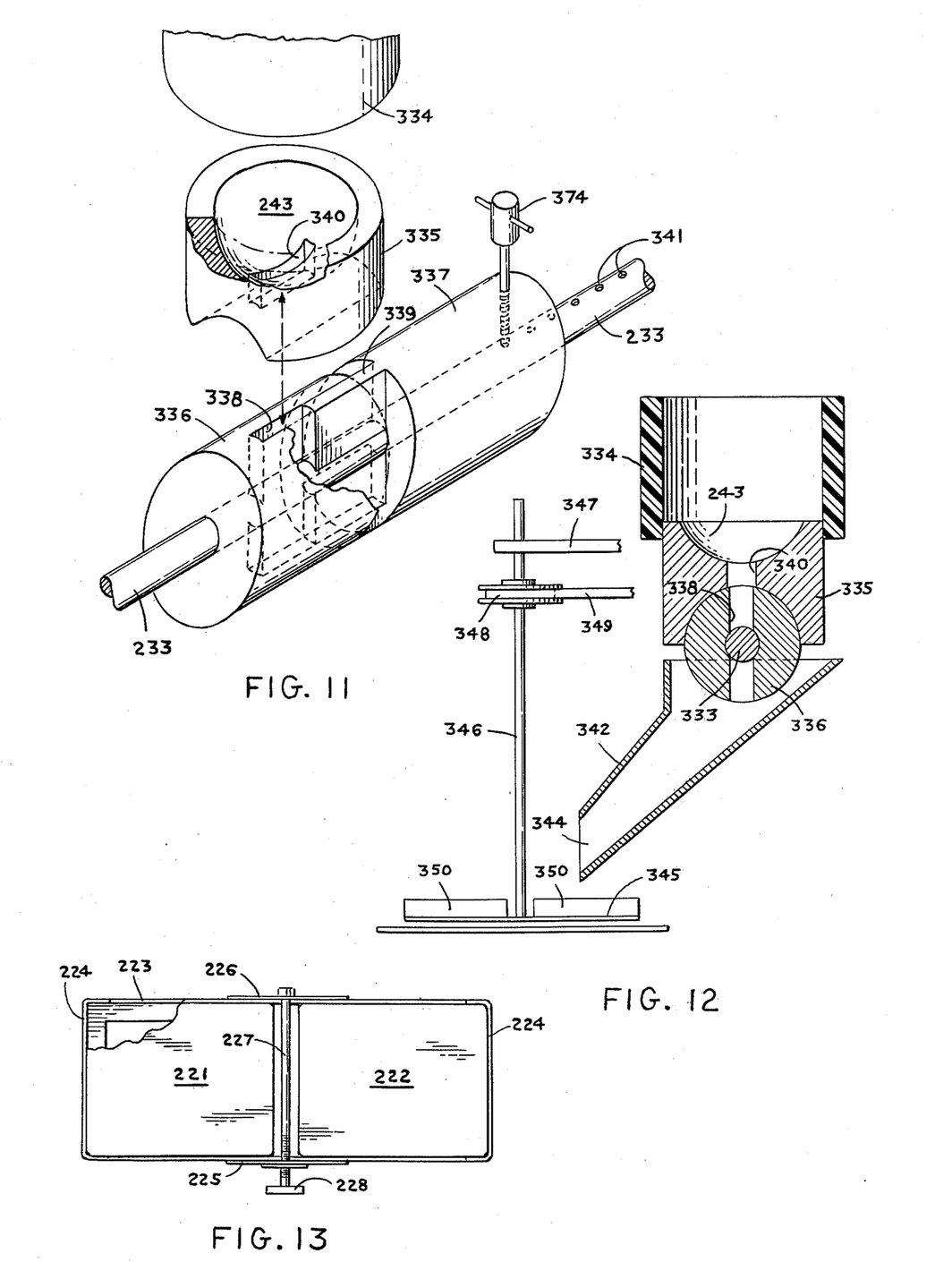
FIG. 11 is an exploded view on enlarged scale and partly broken away and in section of a portion of the embodiment of FIG. 4.
FIG. 12 is a sectional view of the assembled portion of FIG. 11.
FIG. 13 is a plan view, partly broken away, of the mounting support and hoppers of the embodiment of FIG. 4.

The distribution system is illustrated in detail in FIGS. 11 and 12 and is seen to comprise a cylindrical sleeve 334 which fits beneath the outlet of a respective hopper. The cylindrical sleeve 334 is preferably constituted of a synthetic resinous plastic material. The sleeve 334 engages a fitting 335 which mounts on a first tubular part 336 which is fixed to shaft 233. A second tubular part 337 is slidably mounted on shaft 233 and carries a threaded lock bolt 374 which threadably engages in tubular part 337 and is adapted for lockingly engaging shaft 233 in selected, adjusted axial positions of tubular member 337 relative to tubular member 336. The tubular member 336 has a longitudinal slot 338 which receives a tongue 339 which projects from the face of tubular member 337. By slidably adjusting tubular member 337 along shaft 233, the degree of penetration of the tongue 339 in the slot 338 can be adjusted. The fitting 335 is provided with a slot 340 at the bottom of a hollow or recess 343. The fitting 335 is slidably fitted on tubular member 336 so that member 336 can freely rotate within fitting 235. As the tubular member 336 rotates, the slot 338 therein periodically comes into registry with slot 340 in fitting 335. The length of the slot 338 which is exposed and comes into communication with slot 340 can be controlled by the degree of penetration of the tongue 339 into slot 338. The shaft 233 is provided with a series of notches 341 which correspond to different degrees of penetration of the tongue 339 in the slot 338. The lock bolt 374 engages in a selected one of the notches 341 to lock the tubular member 337 on the shaft 233 for the particular size of the slot 338.

In operation, material is supplied from the hopper into the associated sleeve 334 and then into the slot 340. The material then passes into the slot 338 in member 337 and due to the rotation of shaft 233, the material which is in slot 338 is brought to a position in which the slot 338 faces downwardly and the material is discharged by gravity and centrifugal force into a chute 342 located beneath the distribution system 232. The discharge of the material from the slot 340 is facilitated by the placement of the slot at the bottom of the recess 343. The outlet 344 of the chute 342 is positioned above a dispenser plate 345. The dispenser plate 345 is secured to a vertical shaft 346 which is rotatably secured in a projection 347 (FIG. 4) on the mounting structure 220 for the hoppers. Secured on the shaft 346 is a pulley 348 which is driven by a belt 349 from a pulley 350 (FIG. 9) carried on the output shaft of the motor 140. Hence, the shaft 346 is driven in constant rotation and when material is deposited onto the dispensing plate 345 from the chute 342 it will be discharged under centrifugal force. It has been found that the outlet 344 of the chute must be positioned slightly rearwardly of the axis of rotation of shaft 346 in order for a proper forward delivery of the material dispensed from the chute. Upstanding radial vanes 350 are distributed on the upper surface of the distributing plate 345 to facilitate the distribution and discharge of the material dispensed on the distributing plate.

It is thus seen that there is a positive delivery by the distribution system 232 to the dispenser plate 345 under rotational drive of shaft 233 so that precisely measured amounts of material from the hoppers can be fed through the chute onto the dispensing plate.

Although the invention has been described in conjunction with two specific embodiments thereof, it will become apparent to those skilled in the art that numerous modifications and variations can be made within the scope and spirit of the invention as defined by the attached claims.

What is claimed is:

1. An aerator comprising a frame, front wheels, support means mounting said front wheels on said frame for raising and lowering said front wheels, an aerator member including blades mounted rotatably on said frame, rear wheels rotatably mounted on said frame, a dolly wheel mounted on said frame for rotation about a vertical axis at a location rearwards of the rear wheels and at a fixed vertical level, said rear wheels and dolly wheel being positioned on said frame in relation to said front wheels and aerator member such that with said front wheels in said raised position the front wheels and dolly wheel define a common tangential plane which is at a level above the tips of the aerator member and below said rear wheels thereby establishing an operative aerating position whereas in said lowered position the front wheels and dolly wheel define a common tangential plane which is below said aerator member and said rear wheels thereby establishing a transport position, handle means extending upwardly from said frame for manual guidance and propulsion of said frame, first linkage means between said support means and said handle means for effecting raising and lowering of said front wheels, said linkage means including a rod coupled to said support means, a plate to which said rod is pivotably connected, a pin pivotably supporting said plate on said handle means, and an actuator lever secured to said plate to pivot the plate between a first position in which the front wheels are lowered and a second position in which the front wheels are raised, said rod extending along a line which is on one side of the pin in said first and second positions of said plate and on the other side of the pin in going between said first and second positions whereby the linkage means, and thereby the front wheels, are in stable position for both positions of the plate, a motor on said frame, a drive wheel secured to said aerator member, a drive pulley rotatably mounted on said frame, drive means drivingly engaging said drive wheel and driven by said drive pulley, a belt on said drive pulley driven by said motor, a tensioning pulley engaging said belt and having a first position in which the belt is tensioned and drive power is transmitted from the motor to the drive pulley and then to the aerator member and a second position in which the belt travels idly on the drive pulley and thereby the aerator member is at rest, a plate pivotably mounted on said frame, said tensioning pulley being rotatably mounted on said plate for travel therewith, second linkage means between said plate and said handle means for pivotably moving the plate to bring the tensioning pulley between said first and second positions, said second linkage means comprising a bracket pivotably mounted on said handle means for movement about a pivot axis, rod means pivotably connected to said plate and to said bracket, and a further actuator lever connected to said bracket to pivotably move the bracket and thereby said plate, said rod means having an axis along which a line of force is transmitted from said bracket to said plate, said line of force extending on opposite sides of said pivot axis when the tensioning pulley is in said first and second linkage means and thereby said tensioning pulley are in stable position for both positions of said tensioning pulley.

2. An aerator as claimed in claim 1 comprising removable weight means mountable on said frame at a location above said aerator member for selectively applying weight to the aerator member in said operative aerating position.

3. An aerator as claimed in claim 1 wherein said rod means comprises buffer spring means therein for returning said arm to the position in which the tensioning pulley is in said second position for idle of the drive pulley.

4. An aerator as claimed in claim 3 wherein said rod means comprises a first member pivotably connected to said arm and a second member pivotably connected to said bracket, said first and second member being slidably and guidably connected and extending along a common axis, said buffer spring means comprising a spring between said first and second members.

5. An aerator as claimed in claim 1 comprising an L-shaped bracket supporting said dolly wheel from said frame for rotation about a horizontal axis which is vertically offset from said vertical axis.

6. An aerator as claimed in claim 1 wherein in said operative position the blades of the aerator member penetrate into the ground and the front wheels and dolly wheel rest on the ground, said rear wheels being in close proximity to and skimming along the ground as the aerator is advanced in a straight line, the aerator being turnable by laterally inclining the frame so that one rear wheel contacts the ground while the other rear wheel is raised above the ground.

7. A self-propelled aerator and material dispenser comprising a frame, front wheels rotatably secured to said frame, an aerator member including blades rotatably secured to said frame, rear wheels rotatably secured to said frame, a dolly wheel mounted on said frame for rotation about a vertical axis at a location rearwards of the rear wheels, support means for vertical movement of the dolly wheel between raised and lowered positions, said front wheels and rear wheels being positioned on said frame in relation to said dolly wheel and aerator member such that with said dolly wheel in said raised position the front wheels and dolly wheel define a common tangential plane which is at a level above the tips of the blades of the aerator member and below said rear wheels thereby establishing an operative aerating position whereas in said lowered position of the dolly wheel the front wheels and dolly wheel define a common tangential plane which is below said aerator member and said rear wheels thereby establishing a transport position, handle means extending upwardly from said frame for manual guidance and propulsion of said frame, first linkage means between said support means and said handle means for effecting raising and lowering of said dolly wheel, said linkage means including a lever having one end pivotably connected to said frame means on the other end of said lever, a foot-engageable actuator, said lever being pivotably connected to said support means at a location intermediate said ends such that by the lever is pivotable between a first position in which the dolly wheel is lowered and a second position in which the dolly wheel is raised, locking means on said lever and said handle means for locking the dolly wheel in the lowered position, a motor on said frame, a drive pulley rotatably mounted on said frame, a first sprocket wheel secured to said aerator member, a second sprocket wheel secured to said front wheels, a drive means drivingly connecting said first and second sprocket wheels and driven by said drive pulley, a belt on said drive pulley driven by said motor, a tensioning pulley engaging said belt and having a first position in which the belt is tensioned and drive power is transmitted from the motor to the drive pulley and then to the aerator member and front wheels and a second position in which the belt travels idly on the drive pulley and thereby the aerator member and front wheels are at rest, a plate pivotably mounted on said frame, said tensioning pulley being rotatably mounted on said plate for travel therewith, second linkage means between said plate and said handle means for pivotably moving the plate to move the tensioning pulley between said first and second positions, said second linkage means comprising a bracket pivotably mounted on said handle means for movement about a pivot axis, rod means pivotably connected to said plate and to said bracket, and a further actuator lever connected to said bracket to pivotably move the bracket and thereby said plate, said rod means having an axis along which a line of force is transmitted from said bracket to said plate, said line of force extending on opposite sides of said pivot axis when the tensioning pulley is in said first and second positions such that the second linkage means and thereby said tensioning pulley are in stable position for both positions of said tensioning pulley, a rotatable dispensing plate on said frame, drive means connecting said dispensing plate to said motor for rotation of said dispensing plate, a chute on said frame having an inlet and an outlet, said outlet facing said dispensing plate, hopper means mountable on said frame for storing material to be dispensed by said dispenser plate, said hopper means having an outlet, and feed means driven from said drive pulley for feeding measured amounts of material from the outlet of said hopper means to the inlet of said chute.

8. A self-propelled aerator and material dispenser as claimed in claim 7 wherein said feed means is adjustable to regulate the feed of the material from the hopper means to said chute.

9. A self-propelled aerator and material dispenser as claimed in claim 7 wherein said locking means comprises a link pivotably connected to said lever for selectively engaging said handle means and spring means for resiliently urging the arm into locked engaged position with the handle means.

10. A self-propelled aerator and material dispenser as claimed in claim 9 wherein said handle means comprises a cross-arm, said link having a notch engageable with said cross-arm with the dolly wheel in said lowered position.

11. A self-propelled aerator and material dispenser as claimed in claim 10 wherein said link has at least one further notch for engaging the cross-arm with the dolly wheel in partially raised position.

12. A self-propelled aerator and material dispenser as claimed in claim 7 wherein said feed means comprises a fitting for receiving material from the outlet of said hopper means, and adjustable and rotatable distributor means beneath said fitting for feeding material to the inlet of said chute.

13. A self-propelled aerator and material dispenser as claimed in claim 7 comprising removable weight means mountable on said frame at a location above said aerator member for selectively applying weight to the aerator member in said operative aerating position.

14. A self-propelled aerator and material dispenser as claimed in claim 7 wherein said rod means comprises buffer spring means therein for returning said arm to the position in which the tensioning pulley is in said second position for idle of the drive pulley.

15. A self-propelled aerator and material dispenser as claimed in claim 14 wherein said rod means comprises a first member pivotably connected to said arm and a second member pivotably connected to said bracket, said first and second members being slidably and guidably connected and extending along a common axis, said buffer spring means comprising a spring between said first and second members.

16. A self-propelled aerator and material dispenser as claimed in claim 7 comprising a bracket supporting said dolly wheel from said frame for rotation about a horizontal axis which is vertically offset from said vertical axis.

17. An aerator comprising a frame, front wheel means on said frame, rear wheel means rotatably secured to said frame, an aerator member including blades rotatably secured to said frame between the front and rear wheel means, dolly wheel means mounted on said frame for rotation about a vertical axis at a location rearwards of the rear wheel means, said front wheel means and dolly wheel means representing endmost wheel means on said frame, and means for vertically moving one of said endmost wheel means with respect to said frame between raised and lowered positions, said front wheel means and dolly wheel means being positioned on said frame in relation to said rear wheel means and aerator member such that with said one of said endmost wheel means in said raised position front wheel means and dolly wheel means define a common tangential plane which is at a level above the blades of the aerator member and below said rear wheel means thereby establishing an operative aerating position whereas in said lowered position of said one of the endmost wheel means and dolly wheel means the front wheel means and dolly wheel means define a common tangential plane which is at a level below said aerator member and said rear wheel means thereby establishing a transport position.

18. An aerator as claimed in claim 17 comprising removable weight means mountable on said frame at a location above said aerator member for selectively applying weight to the aerator member in said operative aerating position.

19. An aerator as claimed in claim 17 wherein said dolly wheel means comprises a dolly wheel and a bracket supporting said dolly wheel from said frame for rotation about a horizontal axis which is vertically offset from said vertical axis.

* * * * *